(12) United States Patent
Zhang

(10) Patent No.: US 10,689,053 B2
(45) Date of Patent: Jun. 23, 2020

(54) FOLDING SCOOTER FRAME

(71) Applicant: DONGGUAN PRESTIGE SPORTING PRODUCTS CO., LTD., Dongguan (CN)

(72) Inventor: Zhao Zhang, Dongguan (CN)

(73) Assignee: DONGGUAN PRESTIGE SPORTING PRODUCTS CO., LTD., Dongguan (CN)

( * ) Notice: Subject to any disclaimer, the term of this patent is extended or adjusted under 35 U.S.C. 154(b) by 39 days.

(21) Appl. No.: 16/318,267

(22) PCT Filed: Jan. 19, 2017

(86) PCT No.: PCT/CN2017/071688
§ 371 (c)(1),
(2) Date: Jan. 16, 2019

(87) PCT Pub. No.: WO2018/014527
PCT Pub. Date: Jan. 25, 2018

(65) Prior Publication Data
US 2019/0283831 A1    Sep. 19, 2019

(30) Foreign Application Priority Data
Jul. 21, 2016    (CN) .......................... 2016 1 0580245

(51) Int. Cl.
*B62K 15/00* (2006.01)
*B62J 1/28* (2006.01)
*B62K 5/003* (2013.01)
*B62K 5/08* (2006.01)
(Continued)

(52) U.S. Cl.
CPC ............... *B62K 15/008* (2013.01); *B62J 1/28* (2013.01); *B62K 5/003* (2013.01); *B62K 5/007* (2013.01); *B62K 5/08* (2013.01); *B62K 15/006* (2013.01); *B62K 21/125* (2013.01)

(58) Field of Classification Search
CPC .... B62K 15/008; B62K 15/006; B62K 5/007; B62K 21/125; B62K 5/08; B62K 5/003; B62K 3/16; B62K 15/00; B62J 1/28
See application file for complete search history.

(56) References Cited

U.S. PATENT DOCUMENTS 5,002,293 A * 3/1991 Gottselig .................. B62B 3/02
                                                      108/145
5,312,126 A * 5/1994 Shortt ....................... B62K 5/00
                                                      280/287

(Continued)

*Primary Examiner* — Drew J Brown
(74) *Attorney, Agent, or Firm* — Shimokaji IP

(57) ABSTRACT

A folding scooter frame (100) includes a front frame (1), a rear frame (2), a linkage rod (3) and a seat support frame (4). The front frame (1) and the rear frame (2) are pivotally connected. A front end of the linkage rod (3) is connected with the front frame (1), and a rear end of the linkage rod (3) is pivotally connected with a slider (5). A support rod of the seat support frame (4) is pivotally connected with the slider (5), the slider (5) is slidably provided on the rear frame (2). The linkage rod (3) is able to swing as the front vehicle frame (1) is folded and thus drives the slider (5) to slide so as to make the slider (5) drive the seat support frame (4) to fold. The folding scooter frame (100) has the advantages of quick and convenient folding operations.

10 Claims, 4 Drawing Sheets

(51) Int. Cl.
    *B62K 21/12*     (2006.01)
    *B62K 5/007*     (2013.01)

(56) References Cited

U.S. PATENT DOCUMENTS

| | | | |
|---|---|---|---|
| 2003/0141121 A1* | 7/2003 | Flowers | A61G 5/0891 180/65.1 |
| 2012/0193891 A1* | 8/2012 | Wu | B62K 15/008 280/638 |
| 2015/0061263 A1* | 3/2015 | Cheng | B62K 5/003 280/641 |
| 2016/0089285 A1* | 3/2016 | Cheng | B62K 15/006 180/58 |
| 2017/0190377 A1* | 7/2017 | Ku | B62K 15/006 |
| 2018/0271726 A1* | 9/2018 | Wang | A61G 5/128 |
| 2019/0241230 A1* | 8/2019 | Zhang | B62K 5/007 |

* cited by examiner

FOLDING SCOOTER FRAME

FIELD OF THE INVENTION

The present invention relates to a folding scooter frame, and more particularly to a folding scooter frame which is fast and convenient to fold or unfold.

BACKGROUND OF THE INVENTION

Currently, the existing folding electric scooters are manually folded and multiple mechanisms are usually to unfold and fold, which have complicated folding and unfolding operations. For example, the electric scooter is folded: firstly folding a seat back, then folding a seat, and finally folding a scooter frame. The folding step is cumbersome, and the folding speed is slow, which is quite inconvenient. Moreover, for people with mobility difficulties, manual operation spends a lot of time and effort. Therefore, it is inconvenient for those who are inconvenient or physically disabled.

SUMMARY OF THE INVENTION

One objective of the present invention is to provide a folding scooter frame with quick and convenient folding and unfolding operations.

To achieve the above-mentioned objective, the present invention provides a folding scooter frame including a front frame, a rear frame, a linkage rod, and a seat support frame. The front frame and the rear frame are pivotally connected, a front end of the linkage rod is connected with the front frame, and a rear end of the linkage rod is pivotally connected with a slider. Furthermore, a support rod of the seat support frame is pivotally connected with the slider, the slider is slidably disposed on the rear frame, and the linkage rod is urged to swing as the front frame is folded, thereby driving the slider to slide so as to fold the seat support frame.

In comparison with the prior art, by means of a linkage rod, a front end of the linkage rod is connected with the front frame, and a rear end of the linkage rod is pivotally connected with a slider; further, a seat support frame is pivotally connected with the slider, and the slider is slidably disposed on the rear frame. Therefore, the linkage rod is urged to swing as the front frame is folded or unfolded, which drives the slider to slide so as to fold or unfold the seat support frame, thereby folding or unfolding the whole seat. The structure of the present invention is simple, and the operations for folding and unfolding are simplified and quick, thereby improving the convenience.

Preferably, the seat support frame includes a first support rod, a second support rod, a third support rod, and a seat. Furthermore, the first support rod is pivotally connected with the second support rod, a lower end of the third support rod is pivotally connected to the second support rod, two ends of the seat are respectively pivotally connected to upper ends of the first support rod and the third support rod, a lower end of the second support rod is pivotally connected to the rear frame, and a lower end of the first support rod is pivotally connected to the slider.

Preferably, the seat support frame includes a first support rod, a second support rod, a third support rod, and a seat. Furthermore, the first support rod is pivotally connected with the second support rod, a lower end of the third support rod is pivotally connected to the first support rod, two ends of the seat are respectively pivotally connected to upper ends of the second support rod and the third support rod, a lower end of the second support rod is pivotally connected to the rear frame, and a lower end of the first support rod is pivotally connected to the slider.

Preferably, the seat support frame includes a first support rod, a second support rod, and a seat having a telescopic mechanism. Furthermore, the first support rod is pivotally connected with the second support rod, two ends of the seat are respectively pivotally connected to upper ends of the first support rod and the second support rod, a lower end of the second support rod is pivotally connected to the rear frame, and a lower end of the first support rod is pivotally connected to the slider.

Preferably, the front frame includes a front beam, a front bar and a front cross bar. Specifically, a rear end of the front beam is pivotally connected to a front end of the rear frame, a front end of the front bar is pivotally connected to the front cross bar, the front beam has a mounting frame, a front end of the linkage rod is pivotally connected to the mounting frame, and a rear end of the front bar is pivotally connected to the linkage rod.

Preferably, the seat support frame further includes a backrest rod and a backrest pull rod. Specifically, a lower end of the backrest rod is pivotally connected to the second support rod, one end of the backrest pull rod is connected to the backrest rod, and the other end of the backrest pull rod is connected to the seat. By providing the backrest pull rod, the backrest rod can be automatically folded by the backrest pull rod while the seat is being folded.

Preferably, a sliding rail is disposed on the rear frame, and the slider is slidably disposed on the sliding rail. The sliding rail is arranged for limit a sliding direction of the slider to drive the seat support frame.

Preferably, the folding scooter frame further includes a locking member and a locking bar. Specifically, the locking member is pivotally connected to the front frame, and the locking member is provided with a first locking position and a second locking position. Moreover, the locking bar is disposed at the rear frame. When folding, the locking bar is engaged with the first locking position of the locking member, alternatively when unfolding, the locking bar is engaged with the second locking position of the locking member. In this way, the folding scooter frame is stabilized when fully unfolded or fully folded, thereby preventing accidental folding or unfolding the folding scooter frame.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
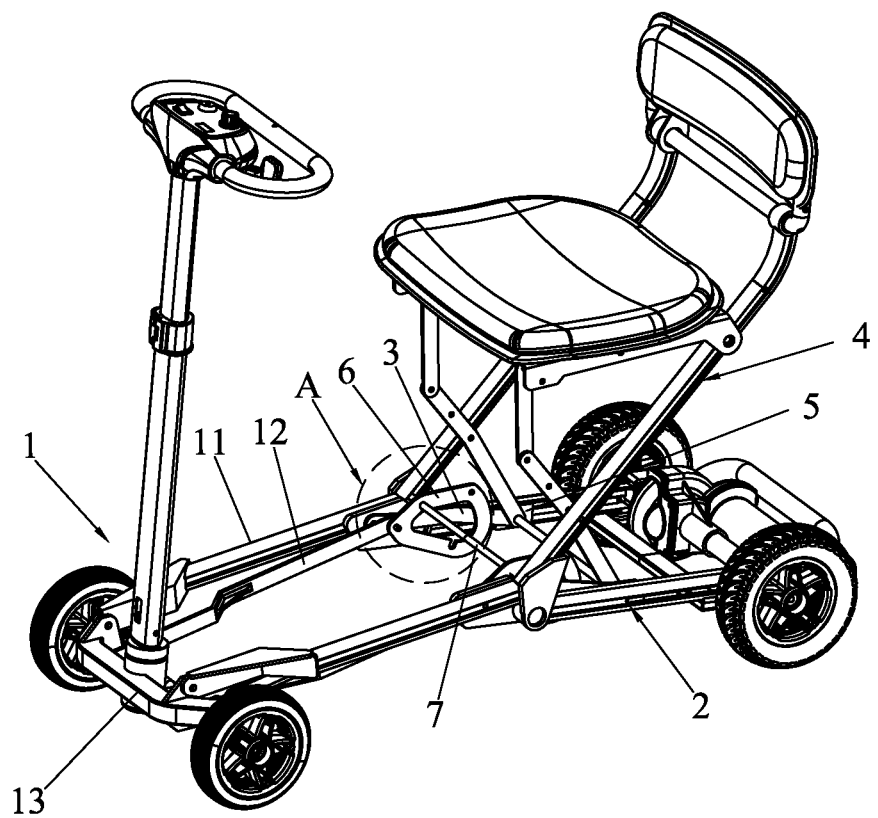
FIG. 1 is a perspective view of a folding scooter according to one embodiment of the present invention.
Figure 2:
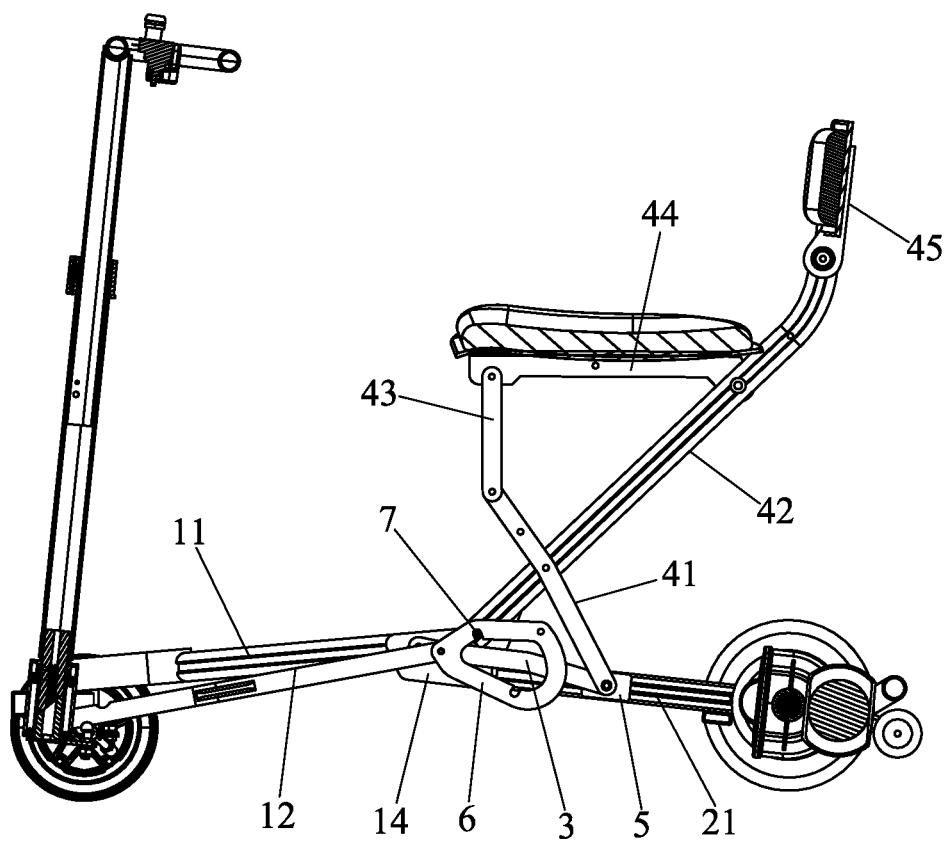
FIG. 2 is a side elevational view of the folding scooter according to one embodiment of the present invention.
Figure 3:
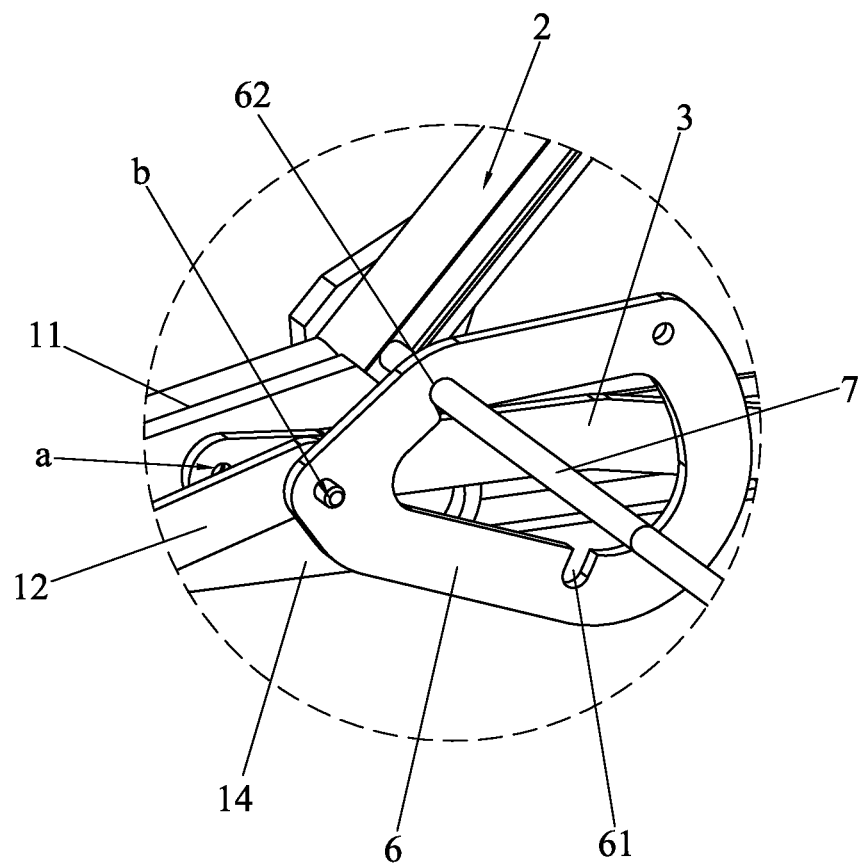
FIG. 3 is an enlarged view of the A portion shown in FIG. 1.

Referring to FIGS. 1-3, the folding scooter frame 100 of the present application includes a front frame 1, a rear frame 2, a linkage rod 3, and a seat support frame 4. Specifically, the front frame 1 is pivotally connected to the rear frame 2. Furthermore, the front frame 1 includes a front beam 11, a front bar 12, and a front cross bar 13. A rear end of the front beam 11 is pivotally connected to a front end of the rear frame 2, and a front end of the front bar 12 is pivotally connected to the front cross bar 13. Furthermore, the front beam 11 has a mounting frame 14. More specifically, a front end of the linkage rod 3 is pivotally connected to the mounting frame 14, the pivot point is "a", and rear ends of the front bar 12 and the linkage rod 3 are pivotally connected by the shaft pin b. Besides, the rear end of the linkage rod 3 is pivotally connected to a slider 5, and a first support rod 41 of the seat support frame 4 is also pivotally connected to the slider 5. Furthermore, a sliding rail 21 is disposed on the rear frame 2 along a length direction of the rear frame 2, and the slider 5 is slidably disposed on the sliding rail 21, which is arranged for limit a sliding direction of the slider 5. Thus, the linkage rod 3 is urged to swing as the front frame 1 is folded, thereby driving the slider 5 to slide so as to fold the seat support frame 4.

As shown in FIG. 2, the seat support frame 4 includes a first support rod 41, a second support rod 42, a third support rod 43, and a seat 44. Specifically, the first support rod 41 is pivotally connected with the second support rod 42, and a lower end of the third support rod 43 is pivotally connected to the first support rod 41, and two ends of the seat 44 are respectively pivotally connected to upper ends of the second support rod 42 and the third support rod 43. A lower end of the second support rod 42 is pivotally connected to the rear frame 2, and a lower end of the first support rod 41 is pivotally connected to the slider 5. In this manner above, the third support rod 43 is disposed in front of the folding scooter frame 100. Of course, the third support rod 43 may be disposed at the rear of the folding scooter frame 100. Specifically, a lower end of the third support rod 43 is pivotally connected to an upper end of the second support rod 42, and two ends of the seat 44 are respectively pivotally connected to upper ends of the first support rod 41 and the third support rod 43. This also makes it possible to obtain another seat support frame 4. In addition, the seat support frame 4 further includes a backrest rod 45 and a backrest pull rod (not shown). Specifically, a lower end of the backrest rod 45 is pivotally connected to the second support rod 42. One end of the backrest pull rod is connected to the backrest rod 45, and the other end of the backrest pull rod is connected to the seat 44. By providing the backrest pull rod, the backrest rod 45 can be automatically folded by the backrest pull rod while the seat is being folded. Specifically, the backrest pull rod may be a rod, so that two ends of the rod are respectively pivotally connected to the backrest rod 45 and the seat 44. Instead, the backrest pull rod may also be a pull belt, and two ends of the pull belt may be respectively connected to the backrest rod 45 and the seat 44.

Referring to FIG. 2 again, the folding scooter frame 100 further includes a locking member 6 and a locking bar 7. Specifically, the locking member 6 is pivotally connected to the front bar of the front frame 1, and the pivot point is the shaft pin b. Furthermore, the locking member 6 is provided with a first locking position 61 and a second locking position 62. Moreover, the locking bar 7 is disposed at the rear frame 2. When folding, the locking bar 7 is engaged with the first locking position 62 of the locking member 6, alternatively when unfolding, the locking bar 7 is engaged with the second locking position 62 of the locking member 6. In this way, the folding scooter frame 100 is stabilized when completely unfolded or folded, thereby preventing accidental folding or unfolding the folding scooter frame 100.

When folding, the locking member 6 is driven to disengage the second locking position 62 of the locking member 6 from the locking bar 7. At this time, the front frame 1 and the rear frame 2 are folded together. Specifically, the front frame 1 drives the linkage rod 3 to swing. Meanwhile the rear end of the linkage rod 3 drives the slider 5 to slide backward along the sliding rail 21. Accordingly the slider 5 drives the first support rod 41 to swing, and the first support rod 41 drives the second support rod 42 and the third support rod 43 to be folded, so that the seat 44 approaches to the rear frame 2; at this time, the seat 44 drives the backrest pull rod to fold the backrest rod 45. When the front frame 1 and the rear frame 2 are completely folded, the seat 44 and the backrest are also completely folded; at this time, the locking bar 7 is engaged with the first locking position 61 of the locking member 6. When unfolding, it is only necessary to unlock the locking member 6 and open the front frame 1 and the rear frame 2, so that the linkage rod 3 and the seat support frame 4 can be unfolded in the opposite direction, thereby completely unfolding the folding scooter frame 100.

In comparison with the prior art, by means of a linkage rod 3, a front end of the linkage rod 3 is connected with the front frame 1, and a rear end of the linkage rod 3 is pivotally connected with a slider 5. Further, a seat support frame 4 is pivotally connected with the slider 5, and the slider 5 is slidably disposed on the rear frame 2. Therefore, the linkage rod 3 is urged to swing as the front frame 1 is folded or unfolded, which drives the slider 5 to slide so as to fold or unfold the seat support frame 4, thereby folding or unfolding the whole seat. The structure is simple, and the operations for folding and unfolding are simplified and quick, thereby improving the convenience.

Figure 4:
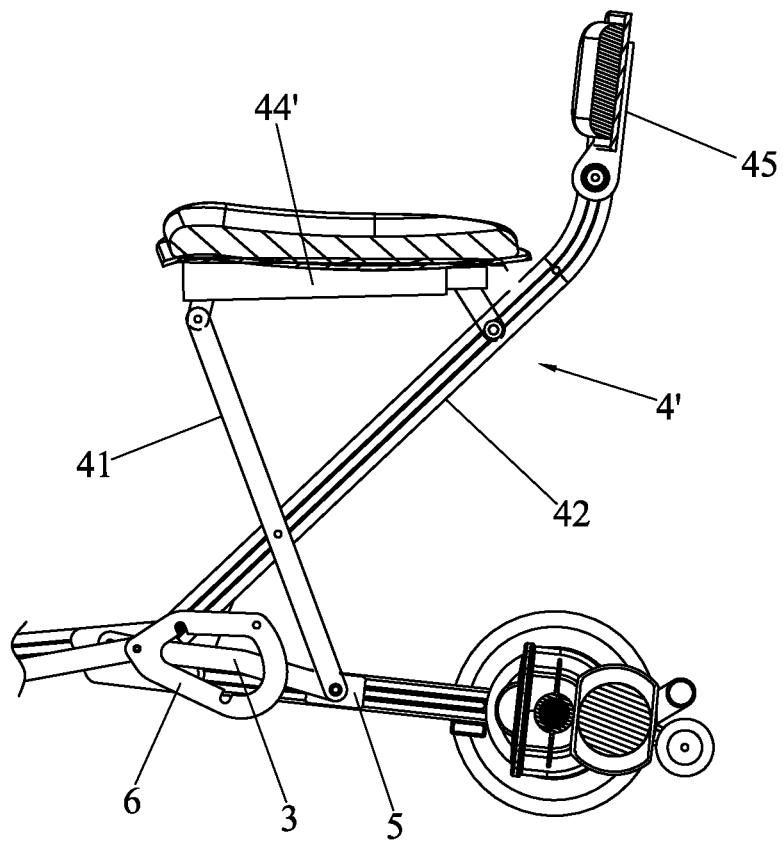
FIG. 4 is a perspective view of a folding scooter frame according to another embodiment of the present invention.

Referring to FIG. 4, another embodiment of the present application is illustrated. In this embodiment, structure of the folding scooter frame is similar to that of the first embodiment. The folding scooter frame also includes the linkage rod 3 and the slider 5 having the same structure as that of the first embodiment. Instead, the folding scooter frame has a different seat support frame 4' from the seat support frame 4. The seat support frame 4' also includes a first support rod 41, a second support rod 42, a backrest rod 45, and a backrest pull rod. However, the folding seat support frame 4' further includes a seat 44' having a telescopic mechanism. In this embodiment, the third support rod is omitted, and two ends of the seat 44' are respectively pivotally connected to of the first support rod 41 and the second support rod 42. When folded, upper ends of the first support rod 41 and the second support rod 42 are separated from each other, so that the seat 44' is elongated to be folded. Besides, other structures in this embodiment works in the same way as that of the first embodiment, and it will not be described in detail.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A folding scooter frame, comprising a front frame, a rear frame, a linkage rod, and a seat support frame, wherein the front frame and the rear frame are pivotally connected, a front end of the linkage rod is connected with the front frame, a rear end of the linkage rod is pivotally connected with a slider, a support rod of the seat support frame is pivotally connected with the slider, the slider is slidably disposed on the rear frame, and the linkage rod is urged to swing as the front frame is folded, thereby driving the slider to slide so as to fold the seat support frame.

2. The folding scooter frame according to claim 1, wherein the seat support frame comprises a first support rod, a second support rod, a third support rod, and a seat, the first support rod is pivotally connected with the second support rod, a lower end of the third support rod is pivotally connected to the second support rod, two ends of the seat are respectively pivotally connected to upper ends of the first support rod and the third support rod, a lower end of the second support rod is pivotally connected to the rear frame, and a lower end of the first support rod is pivotally connected to the slider.

3. The folding scooter frame according to claim 1, wherein the seat support frame comprises a first support rod, a second support rod, a third support rod, and a seat, the first support rod is pivotally connected with the second support rod, a lower end of the third support rod is pivotally connected to the first support rod, two ends of the seat are respectively pivotally connected to upper ends of the second support rod and the third support rod, a lower end of the second support rod is pivotally connected to the rear frame, and a lower end of the first support rod is pivotally connected to the slider.

4. The folding scooter frame according to claim 1, wherein the seat support frame comprises a first support rod, a second support rod, and a seat having a telescopic mechanism, the first support rod is pivotally connected with the second support rod, two ends of the seat are respectively pivotally connected to upper ends of the first support rod and the second support rod, a lower end of the second support rod is pivotally connected to the rear frame, and a lower end of the first support rod is pivotally connected to the slider.

5. The folding scooter frame according to claim 1, wherein the front frame comprises a front beam, a front bar and a front cross bar, a rear end of the front beam is pivotally connected to a front end of the rear frame, a front end of the front bar is pivotally connected to the front cross bar, the front beam has a mounting frame, a front end of the linkage rod is pivotally connected to the mounting frame, and a rear end of the front bar is pivotally connected to the linkage rod.

6. The folding scooter frame according to claim 2, wherein the seat support frame further comprises a backrest rod and a backrest pull rod, a lower end of the backrest rod is pivotally connected to the second support rod, one end of the backrest pull rod is connected to the backrest rod, and the other end of the backrest pull rod is connected to the seat.

7. The folding scooter frame according to claim 1, wherein a sliding rail is disposed on the rear frame, and the slider is slidably disposed on the sliding rail.

8. The folding scooter frame according to claim 1, further comprising a locking member and a locking bar, wherein the locking member is pivotally connected to the front frame, the locking member is provided with a first locking position and a second locking position, the locking bar is disposed at the rear frame, when folding, the locking bar is engaged with the first locking position of the locking member, alternatively when unfolding, the locking bar is engaged with the second locking position of the locking member.

9. The folding scooter frame according to claim 3, wherein the seat support frame further comprises a backrest rod and a backrest pull rod, a lower end of the backrest rod is pivotally connected to the second support rod, one end of the backrest pull rod is connected to the backrest rod, and the other end of the backrest pull rod is connected to the seat.

10. The folding scooter frame according to claim 4, wherein the seat support frame further comprises a backrest rod and a backrest pull rod, a lower end of the backrest rod is pivotally connected to the second support rod, one end of the backrest pull rod is connected to the backrest rod, and the other end of the backrest pull rod is connected to the seat.

* * * * *